United States Patent
Benjamin (10) Patent No.: US 9,360,392 B2
(45) Date of Patent: Jun. 7, 2016

(54) CALIBRATION OF OPTICAL TIME DOMAIN REFLECTOMETRY OPTICAL LOSS MEASUREMENT IN OPTICAL FIBERS HAVING POTENTIALLY DISSIMILAR LIGHT BACKSCATTERING EFFICIENCIES

(71) Applicant: Corning Cable Systems LLC, Hickory, NC (US)

(72) Inventor: Seldon David Benjamin, Painted Post, NY (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 61 days.

(21) Appl. No.: 13/930,492

(22) Filed: Jun. 28, 2013

(65) Prior Publication Data

US 2015/0002837 A1    Jan. 1, 2015

(51) Int. Cl.
*G01M 11/00* (2006.01)

(52) U.S. Cl.
CPC ...... *G01M 11/3145* (2013.01); *G01M 11/3109* (2013.01)

(58) Field of Classification Search
CPC .................................. G01M 11/3109–11/3163
USPC .................................................. 356/73.1, 445
See application file for complete search history.

(56) References Cited

U.S. PATENT DOCUMENTS

| | | | |
|---|---|---|---|
| 4,823,166 A * | 4/1989 | Hartog et al. | 356/44 |
| 4,921,347 A * | 5/1990 | Wong et al. | 356/73.1 |
| 5,062,704 A | 11/1991 | Bateman | 356/73.1 |
| 5,801,953 A * | 9/1998 | Thoma et al. | 702/68 |
| 6,459,478 B1 * | 10/2002 | Schmidt et al. | 356/73.1 |
| 6,856,400 B1 | 2/2005 | Froggatt | 356/477 |
| 6,960,028 B2 | 11/2005 | Lampert | 385/81 |
| 6,970,237 B1 | 11/2005 | Stolte | 356/73.1 |
| 2005/0057880 A1 * | 3/2005 | Bailey et al. | 361/119 |
| 2009/0245476 A1 * | 10/2009 | Lindqvist | 379/32.04 |
| 2012/0045205 A1 * | 2/2012 | Perron | 398/48 |

FOREIGN PATENT DOCUMENTS

| | | | | |
|---|---|---|---|---|
| EP | 543577 A2 | 5/1993 | | G01M 11/00 |
| EP | 0926479 B1 | 6/1999 | | G01M 11/00 |
| WO | WO2004/090499 A1 | 10/2004 | | G01M 11/00 |
| WO | WO2010/043056 A1 | 4/2010 | | H04B 10/08 |

* cited by examiner

*Primary Examiner* — Michael A Lyons
*Assistant Examiner* — Dominic J Bologna (57) ABSTRACT

Calibration of optical time domain reflectometry optical loss measurement in optical fibers having potentially dissimilar light backscattering properties is disclosed. For example, an optical time domain reflectometer (OTDR) can be employed to perform a single-ended optical loss measurement on an optical fiber before and after joinder (e.g., a splice) to determine the efficiency of the joinder. The individual optical fibers provided in a joined optical fiber may have dissimilar backscatter light collection efficiencies resulting in an erroneous OTDR optical loss measurement, because an OTDR assumes the backscatter light collection efficiency of the joined optical fiber is identical before and after joinder. An OTDR calibration factor is first determined before an OTDR optical loss measurement of the joined optical fiber is made. The OTDR calibration factor is used to correct any error in an OTDR optical loss measurement of the joined optical fiber.

20 Claims, 4 Drawing Sheets

CALIBRATION OF OPTICAL TIME DOMAIN REFLECTOMETRY OPTICAL LOSS MEASUREMENT IN OPTICAL FIBERS HAVING POTENTIALLY DISSIMILAR LIGHT BACKSCATTERING EFFICIENCIES

BACKGROUND

The technology of this disclosure relates to measurement of optical loss in optical fibers using optical time domain reflectometry. The disclosure is particularly related to calibration of optical loss measurement in optical time domain reflectometry for joined optical fibers having potentially dissimilar properties, resulting in the joint optical fibers having potentially dissimilar light backscattering efficiencies, since collection efficiencies may be caused by a variety of different optical properties, as discussed below.

Benefits of utilizing optical fiber include extremely wide bandwidth and low noise operation. Because of these advantages, optical fiber is increasingly being used for a variety of communications applications. These communications applications include, but are not limited to, broadband voice, video, and data transmissions in communications networks.

It is desirable to be aware of optical loss (i.e., optical attenuation) present in optical fiber used in communications networks to understand its impact on communications performance. Loss in optical fiber (referred to as "optical fiber loss") can cause signal loss, which can reduce the bandwidth and data rate capabilities of the optical fiber. Optical fiber loss is the reduction in light intensity between light transmitted from an input of the optical fiber to an output of the optical fiber. Optical fiber loss is usually expressed as decibels (dB) per kilometer (km) (dB/km). Optical fiber loss can result from a variety of different issues and every optical fiber will have some degree of optical loss. The material of the optical fiber and its manufacturing tolerances are sources of optical fiber loss. Optical fiber loss can also be caused by unintended optical attenuation or discontinuity that occurs due to severe bending of the optical fiber or other damage to the optical fiber. Optical fiber loss can also result from discontinuities and alignment issues resulting from connectorizing optical fibers. For example, optical fiber communications networks include a number of optical interconnection points in fiber optic equipment and between fiber optic cables in which optical fibers must be interconnected via fiber optic connections. Each of these fiber optic connections provides for the possibility of a discontinuity or optical alignment issue.

Figure 1:
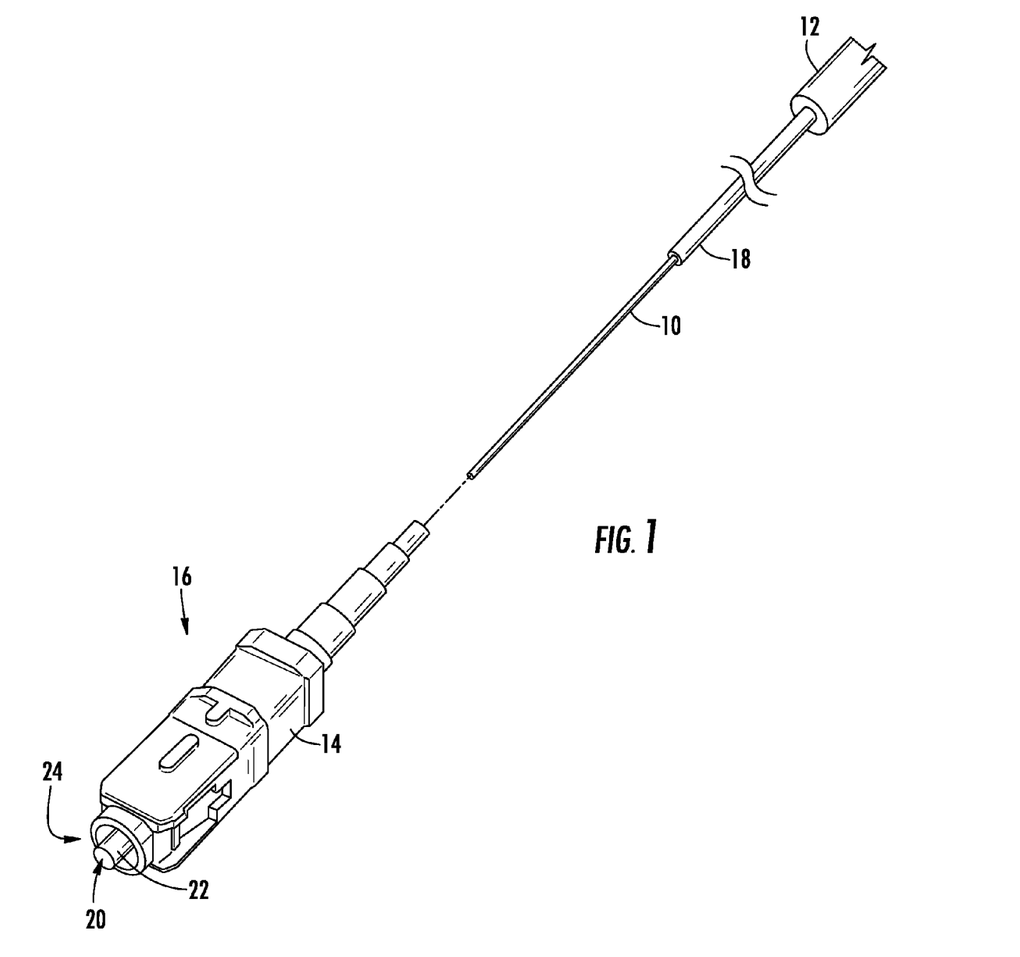
FIG. 1 is a perspective view of an exemplary field optical fiber from a fiber optic cable prepared to inserted into a housing of a fiber optic connector to be spliced to a stub fiber in the fiber optic connector to provide a joined optical fiber, wherein the field optical fiber and the stub fiber have dissimilar backscatter light collection efficiencies.

FIG. 1 is a schematic diagram of an exemplary field optical fiber from a fiber optic cable that is prepared to be inserted into a housing of a fiber optic connector and to further be spliced to a stub optical fiber (referred to herein as a "stub fiber") in the fiber optic connector to provide a joined optical fiber, wherein the field optical fiber and the stub fiber have dissimilar backscatter light collection efficiencies.

For example, FIG. 1 is a schematic diagram of an exemplary optical fiber 10 from a fiber optic cable 12 that is prepared to be inserted into a housing 14 of a fiber optic connector 16 to connectorize the optical fiber 10. The optical fiber 10 is exposed from a coating or buffer tube 18 to be prepared to be inserted into the housing 14. The optical fiber 10 of the fiber optic cable 12 can be connectorized in the field by a technician. In this example, the fiber optic connector 16 is from the UNICAM® family of fiber optic connectors available from Corning Cable Systems, LLC of Hickory, N.C. The fiber optic connector 16 contains a stub fiber 20 that is installed in a ferrule 22. The stub fiber 20 is shown in FIG. 1 extending from a front end 24 of the ferrule 22. U.S. Pat. Nos. 6,816,661 and 6,931,193, incorporated by reference herein in their entireties, describe a UNICAM® installation tool also available from Corning Cable Systems, LLC to splice the optical fiber 10 to the stub fiber 20 to connectorize the fiber optic cable 12. The splicing of the optical fiber 10 to the stub fiber 20 provides a joined optical fiber (not shown).

The technician may measure the loss in the optical fiber 10 after installation of the fiber optic connector 16 to ensure that the optical fiber 10 loss in the joined optical fiber comprised of the optical fiber 10 spliced with the stub fiber 20 is within acceptable limits. One method of measuring loss in an optical fiber is a double-ended optical loss measurement method. A double-ended optical loss measurement is a direct optical loss measurement. In a double-ended optical loss measurement, an optical signal from a light source is launched into one end of the optical fiber as an input end. A power meter coupled to the other end of the optical fiber as the output end measures the intensity of light transmitted through the optical fiber and received at the output end. The intensity of light at the output end of the optical fiber subtracted from the intensity of the light launched into the input end of the optical fiber is the amount of optical fiber loss. However, double-ended optical loss measurement requires access to both ends of the optical fiber. But, both ends of the optical fiber may not be accessible. Even if available, a double-ended optical loss measurement may require two technicians, one for each end of the optical fiber.

An optical time domain reflectometer (OTDR) can be used in a single-ended optical loss measurement method to indirectly measure optical fiber loss by only having access to one end of the optical fiber. In an OTDR, the light pulses from a light source are launched into an input end of the optical fiber. The optical fiber returns a small portion of light received at the input end back to the input end as scattered light due to the Rayleigh effect. This is referred to as "backscattered light." The optical fiber has a backscatter light collection efficiency, which is based on the intensity of backscattered light in the optical fiber for a given intensity of light transmitted in the optical fiber in a forward direction. Thus, during the interval between the light pulses, this backscattered light from the optical fiber can be measured as an indirect method to measure the optical loss in the optical fiber. In an OTDR, a light detector is provided that receives the returned backscattered light from the optical fiber between the light pulses. An OTDR converts the detected backscattered light signal into an electrical signal, which is amplified, sampled, and displayed on an output device to indicate the optical fiber loss.

Determining any change in optical loss as a result of joining two or more optical fibers together using OTDR optical loss measurement would assume that the backscatter light collection efficiency of the optical fiber measured is identical before and after the joinder. This is necessary to be able to compare the optical loss before and after the joinder. However, this may not necessarily be true for certain types of optical fibers. For example, with reference to FIG. 1, the optical fiber 10 and the stub fiber 20 may have dissimilar properties that provide for each optical fiber to have different backscatter light collection efficiencies. Thus, the intensity of light backscattered by the optical fiber 10 and the stub fiber 20 for a given intensity of input light can vary. For example, the optical fiber 10 and the stub fiber 20 may have different core sizes. As another example, the optical fiber 10 and the stub fiber 20 may be manufactured from different materials and/or different manufacturers having different manufacturing processes. Even if the optical fiber 10 and the stub fiber 20 are manufactured by the same manufacturer using the same manufacturing process, variations in manufacturing processes can still occur that provide for the optical fiber 10 and the stub fiber 20 to have dissimilar properties.

Thus, an OTDR may not accurately measure optical fiber loss as a result of joined optical fibers when the loss event is due to the joinder of optical fibers having dissimilar backscatter light collection efficiencies. Determining any change in optical loss as a result of joining optical fibers using OTDR optical loss measurement would assume that the backscatter light collection efficiency of the optical fiber measured is identical before and after the joinder, so that the optical loss can be compared before and after the joinder.

No admission is made that any reference cited herein constitutes prior art. Applicant expressly reserves the right to challenge the accuracy and pertinency of any cited documents.

SUMMARY

Embodiments disclosed herein include calibration of optical time domain reflectometry optical loss measurement in optical fibers having potentially dissimilar light backscattering properties. Related methods and OTDRs are also disclosed. In certain embodiments disclosed herein, an OTDR is employed to provide a single-ended, optical loss measurement on a joined optical fiber. A joined optical fiber is comprised of two or more optical fibers joined together. As a non-limiting example, a joined optical fiber may be comprised of stub fiber in a fiber optic connector being spliced to an optical fiber in a fiber optic cable to connectorize the fiber optic cable. An OTDR optical loss measurement can be performed on a joined optical fiber before and after joinder to determine the efficiency of the joinder. However, the individual optical fibers provided in the joined optical fiber may have dissimilar backscatter light collection efficiencies resulting in an erroneous OTDR optical loss measurement, because an OTDR optical loss measurement assumes the backscatter light collection efficiency of the joined optical fiber is identical before and after joinder. However, the backscatter light collection efficiency of the joined optical fiber may be different before joinder.

In this regard, in embodiments disclosed herein, an OTDR calibration factor is first determined before an OTDR optical loss measurement of the joined optical fiber is performed. The OTDR calibration factor represents error, if any, in an OTDR optical loss measurement of the joined optical fiber. The OTDR calibration factor represents the difference between the direct optical loss measurement in the joined optical fiber and the indirect, OTDR optical loss measurement on the joined optical fiber. The OTDR calibration factor can be used to adjust an OTDR optical loss measurement of the joined optical fiber after joinder to account for an OTDR optical loss measurement error resulting from dissimilar backscatter light collection efficiencies in the joined optical fiber. Otherwise, an OTDR optical loss measurement without use of the OTDR calibration factor on the joined optical fiber may not be accurate, because an OTDR optical loss measurement assumes that the backscatter light collection efficiency of the joined optical fiber is identical before joinder and after joinder.

To determine the OTDR calibration factor in one embodiment, a doubled-ended optical loss measurement is first made on a sample of the joined optical fiber to determine the direct optical loss of the joined optical fiber. An OTDR is then used to perform an indirect, single-ended optical loss measurement on the sample of the joined optical fiber. The OTDR calibration factor is the difference between the direct doubled-ended optical loss measurement and the indirect single-ended OTDR optical loss measurement on the joined optical fiber sample. This difference, if any, indicates the error, if any, in using an OTDR to measure optical loss of the joined optical fiber. Error should be present if the joined optical fiber is comprised of multiple optical fibers having dissimilar backscatter light collection efficiencies. If no dissimilarity exists in the measured optical fiber, the difference between the direct doubled-ended optical loss measurement and the indirect single-ended OTDR optical loss measurement on the sample of the joined optical fiber sample should ideally be zero. The OTDR calibration factor can then be used to adjust a single-ended OTDR optical loss measurement of any joined optical fiber comprised of optical fibers provided in the sample of the joined optical fiber, to provide a more accurate OTDR optical loss measurement of the joined optical fiber.

In this regard and in one embodiment, a method of calibrating an OTDR used to measure optical loss of an optical fiber is provided. The method comprises providing a joined optical fiber sample having a backscatter light collection efficiency. The joined optical fiber sample comprises a first optical fiber sample having a first backscatter light collection efficiency joined to a second optical fiber sample having a second backscatter light collection efficiency. The method also comprises measuring a direct optical loss of the joined optical fiber sample using a double-ended optical loss measurement of the joined optical fiber sample. The method also comprises measuring an OTDR optical loss of the joined optical fiber sample using a single-ended OTDR optical loss measurement of the joined optical fiber sample. The method also comprises determining an OTDR calibration factor for the joined optical fiber sample based on the direct optical loss measurement of the joined optical fiber sample and the OTDR optical loss measurement of the joined optical fiber sample. The method also comprises measuring the OTDR optical loss of a joined optical fiber using the single-ended OTDR optical loss measurement of the joined optical fiber. The joined optical fiber comprises a first optical fiber having the first backscatter light collection efficiency of the first optical fiber sample and a second optical fiber having the second backscatter light collection efficiency of the second optical fiber sample. The method also comprises adjusting the OTDR optical loss measurement of the joined optical fiber based on the OTDR calibration factor. The method also comprises providing the adjusted OTDR optical loss measurement as the direct optical loss of the joined optical fiber.

In another embodiment, an OTDR is provided. The OTDR is comprised of an optical transmitter. The optical transmitter is configured to be coupled to a first end of the joined optical fiber. The optical transmitter is configured to launch a light into the first end of a joined optical fiber towards a second end of the joined optical fiber. The OTDR is also comprised of an OTDR optical detector. The OTDR optical detector is configured to be coupled to the first end of the joined optical fiber. The OTDR optical detector is configured to receive an OTDR optical signal comprising backscattered light from the joined optical fiber. The backscattered light comprises returned scattered light from the light launched into the joined optical fiber. The OTDR detector is also configured to convert the received OTDR optical signal into an OTDR electrical signal representing an OTDR optical loss measurement in the joined optical fiber. The OTDR also comprises a controller. The controller is configured to receive an OTDR calibration factor based on a direct optical loss measurement of a joined optical fiber sample having a backscatter light collection efficiency of the joined optical fiber and the OTDR optical loss measurement of the joined optical fiber sample. The controller is also configured to store the OTDR calibration factor in memory. The controller is also configured to receive the OTDR electrical signal from the OTDR converter representing the OTDR optical loss measurement in the joined optical fiber. The controller is also configured to adjust the OTDR optical loss measurement of the joined optical fiber based on the stored OTDR calibration factor. The controller is also configured to provide the adjusted OTDR optical loss measurement of the joined optical fiber as an OTDR optical loss of the joined optical fiber.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein. Whenever possible, like reference numbers will be used to refer to like components or parts.

Embodiments disclosed herein include calibration of optical time domain reflectometry optical loss measurement in optical fibers having potentially dissimilar light backscattering properties. Related methods and OTDRs are also disclosed. In certain embodiments disclosed herein, an OTDR is employed to provide a single-ended, optical loss measurement on a joined optical fiber. A joined optical fiber is comprised of two or more optical fibers joined together. As will be discussed in more detail below, an OTDR optical loss measurement can be performed on a joined optical fiber before and after joinder to determine the efficiency of the joinder, even if the individual optical fibers provided in the joined optical fiber have dissimilar backscatter light collection efficiencies.

Figure 2:
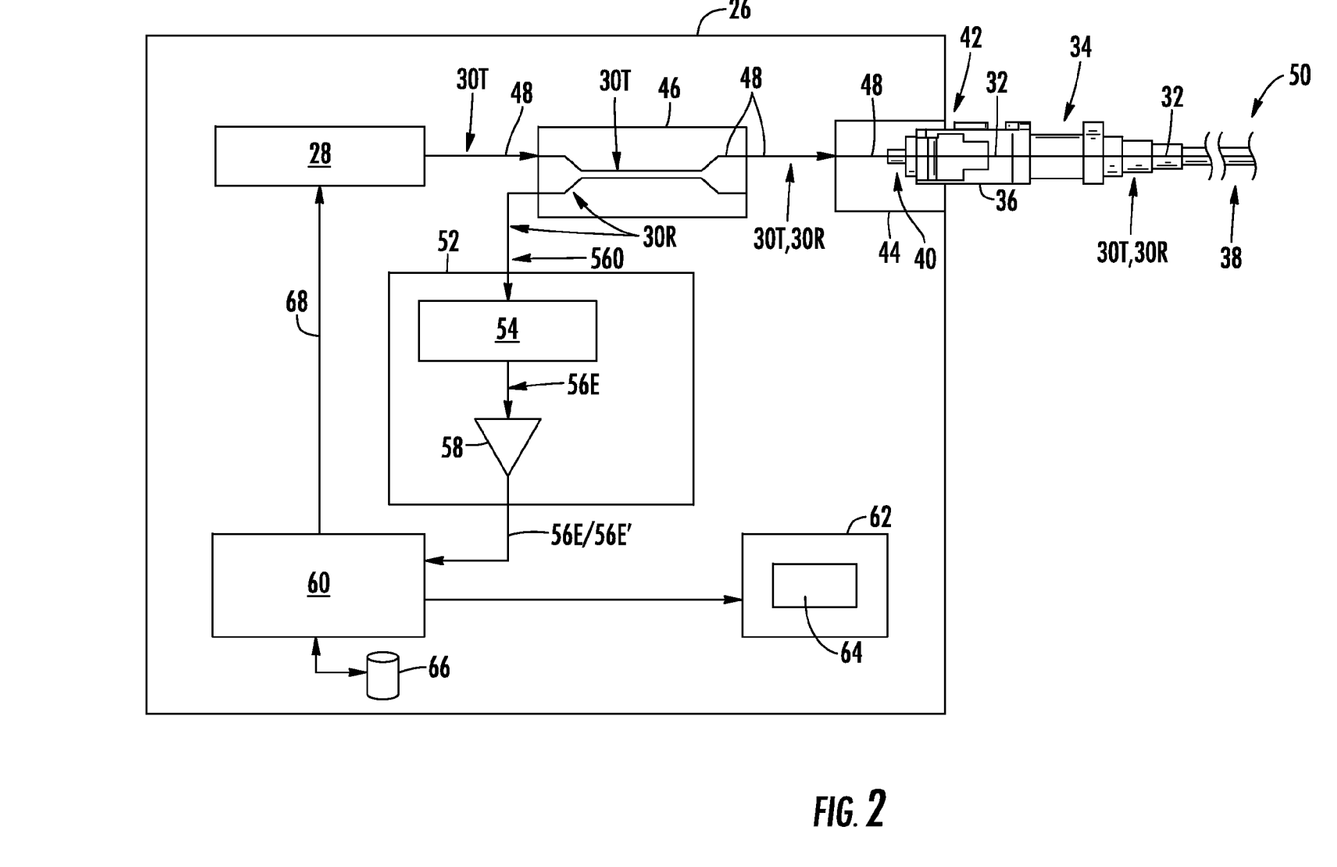
FIG. 2 is a schematic diagram of an exemplary OTDR that can be employed to perform a single-ended, optical loss measurement of an optical fiber.

Before discussing exemplary details regarding exemplary calibration of optical time domain reflectometry optical loss measurement in optical fibers having potentially dissimilar light backscattering efficiencies, an exemplary OTDR 26 in FIG. 2 is described. As will be described below, the OTDR 26 in FIG. 2 can be employed to perform an accurate single-ended, optical loss measurement of an optical fiber having a consistent or substantially consistent backscatter light collection efficiency. However, the OTDR 26 in FIG. 2 may not perform as accurately for a single-ended, optical loss measurement of an optical fiber having dissimilar backscatter light collection efficiencies, such as for a joined optical fiber comprised of two or more optical fibers each having dissimilar backscatter light collection efficiencies.

With reference to FIG. 2, the OTDR 26 includes optical transmitter 28 for generating and transmitting optical pulses 30T that are launched into an optical fiber 32 under an OTDR optical loss measurement. As a non-limiting example, the optical transmitter 28 may be a single mode laser or multi-mode laser. The optical fiber 32 may be provided as part of a fiber optic cable assembly 34 comprised of a fiber optic connector 36 terminating the optical fiber 32 from a fiber optic cable 38. A first end 40 of the optical fiber 32 is coupled to the OTDR 26 via insertion into a fiber optic connector port 42, which may be a fiber optic adapter 44 configured to receive the fiber optic connector 36. The optical pulses 30T emitted by the optical transmitter 28 are launched into the first end 40 of the optical fiber 32 as a result of the first end 40 of the optical fiber 32 being optically connected via an optical coupler 46 to a transmission optical fiber 48 optically connecting to the optical transmitter 28 and the first end 40 of the optical fiber 32.

With continuing reference to FIG. 2, the first end 40 of the optical fiber 32 connected to the fiber optic connector port 42 receives as input, the optical pulses 30T emitted by the optical transmitter 28 during an OTDR optical loss measurement. The optical pulses 30T are transmitted from the first end 40 of the optical fiber 32 to a second end 50 of the optical fiber 32. The optical fiber 32 generates scattered light as a result of the optical pulses 30T being transmitted in the optical fiber 32. The optical fiber 32 returns a small portion of returned backscatter light 30R from optical pulses 30T back to the first end 40 of the optical fiber 32 as scattered light due to the "Rayleigh" effect. This small portion of returned backscatter light 30R is also referred to as "backscatter light 30R." The intensity (i.e., strength) of the backscatter light 30R is based on the backscatter light collection efficiency of the optical fiber 32. The intensity of the backscatter light 30R can be indirectly correlated to an optical attenuation (i.e., loss) characteristic in the optical fiber 32. Thus, OTDR can be used to determine a change in OTDR optical loss of the optical fiber 32 as the optical fiber 32 undergoes initial manufacturing, through cabling, through connectorization. Any detected change in OTDR optical loss can be used to determine discontinuities or other faults in the optical fiber 32.

With continuing reference to FIG. 2, to measure OTDR optical loss in the optical fiber 32, the backscatter light 30R is measured during intervals between the optical pulses 30T. In this regard, an OTDR detector 52 is included in the OTDR 26. The OTDR detector 52 includes an OTDR optical detector 54 is coupled to the fiber optic connector port 42 to be optically connected to an optical fiber 32. The OTDR optical detector 54 is to be configured to receive an OTDR optical signal 56O comprising the backscatter light 30R returned from the optical fiber 32. The OTDR optical detector 54 is also configured to convert the received backscatter light 30R into an OTDR electrical signal 56E representing an OTDR optical loss measurement in the optical fiber 32. The OTDR electrical signal 56E can be amplified by an optional amplifier 58 to provide an amplified OTDR electrical signal 56E'. The OTDR electrical signal 56E or amplified ODR electrical signal 56E' is provided to a controller 60 in the OTDR 26. The controller 60 may be a microcontroller or microprocessor, as non-limiting examples. The controller 60 can further process the OTDR electrical signal 56E, if needed or desired, and/or can provide the OTDR electrical signal 56E to a display 62 to be displayed as a OTDR optical loss measurement 64 for the optical fiber 32. The controller 60 may also store a digital representation of the OTDR optical loss measurement 64 of the optical fiber 32 may in memory 66 provided in the OTDR 26. The controller 60 can also be coupled to the optical transmitter 28 via a control line 68 to control initiation of an OTDR optical loss measurement.

It may be desired to use the an OTDR, such as OTDR 26 in FIG. 2, to determine a change in optical loss of an optical fiber as a result of connectorization. However, if the fiber optic connector used to connectorize the optical fiber contains a stub fiber that is joined (e.g., spliced) with the optical fiber to provide a joined optical fiber, OTDR optical loss measurement may not provide an accurate optical loss. Use of the OTDR 26 in FIG. 2 to determine change in optical loss in an optical fiber before and after joinder assumes that the backscatter light collection efficiency of the optical fiber is identical before joinder and after the joinder. However, this may not necessarily be true for certain types of optical fibers. For example, with reference to FIG. 1 as an example of a joined optical fiber, the optical fiber 10 and the stub fiber 20 may have dissimilar properties that provide for each optical fiber to have different backscatter light collection efficiencies. For example, the optical fiber 10 and the stub fiber 20 may have different core sizes. As another example, the optical fiber 10 and the stub fiber 20 may be manufactured from different materials and/or different manufacturers having different manufacturing processes. Thus, the intensity of light backscattered by the optical fiber 10 and the stub fiber 20 for a given intensity of input light can vary.

To allow OTDR optical loss measurement to be more accurately employed to determine the change in optical loss in an optical fiber before joinder and after joinder to form a joined optical fiber, embodiments disclosed below include examples of the calibration of OTDR optical loss measurement. The calibration of OTDR optical loss measurement is provided by determining an OTDR calibration factor. As will be described in more detail below, the OTDR calibration factor represents error, if any, in an OTDR optical loss measurement of the joined optical fiber. The OTDR calibration factor represents the difference between the direct optical loss measurement in the joined optical fiber and the indirect, OTDR optical loss measurement on the joined optical fiber. The OTDR calibration factor can be used to adjust an OTDR optical loss measurement of the joined optical fiber after joinder to account for an OTDR optical loss measurement error resulting from dissimilar backscatter light collection efficiencies in the joined optical fiber. Otherwise, an OTDR optical loss measurement without use of the OTDR calibration factor on the joined optical fiber may not be accurate, because an OTDR optical loss measurement assumes that the backscatter light collection efficiency of the joined optical fiber is identical before joinder and after joinder.

Figure 3:
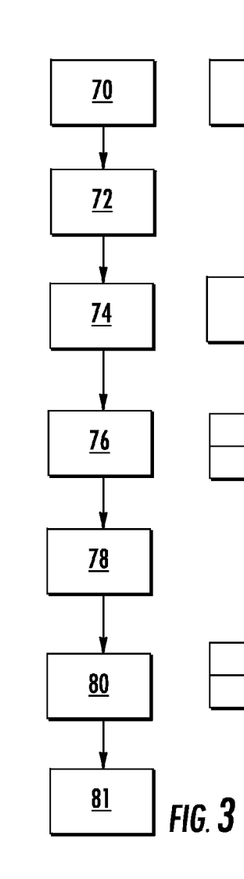
FIG. 3 is a flowchart illustrating an exemplary process for determining an OTDR calibration factor that can be used to adjust a single-ended OTDR optical loss measurement of a joined optical fiber.

In this regard, FIG. 3 is a flowchart illustrating an exemplary process for determining an OTDR calibration factor that can be used to adjust a single-ended OTDR optical loss measurement of a joined optical fiber, such as the optical fiber 10 joined with the stub fiber 20 in FIG. 1. The exemplary process in FIG. 3 will be discussed in conjunction with optical loss measurement apparatuses in FIGS. 4A-4D.

In this regard, with reference to FIG. 3, an optional first step may be to determine a baseline direct optical loss measurement of a sample of an optical fiber of interest (referred to as "optical fiber sample") (block 70 in FIG. 3). The determined baseline optical loss measurement of the optical fiber sample can be used as a baseline optical loss in a determined OTDR calibration factor, as will be discussed in more detail below. A baseline optical loss measurement of an optical fiber sample allows a baseline optical loss of an optical fiber having the same or similar optical properties of the optical fiber sample to be determined and known. The optical loss measurement of an optical fiber sample is performed as opposed to on the actual optical fiber joined with another optical fiber, because it may be desired to perform a double-ended direct optical fiber loss measurement. It may not be feasible or it may be difficult to perform a double-ended optical fiber loss measurement on an optical fiber to be joined. This is illustrated by example in the schematic diagram of an exemplary optical fiber loss measurement apparatus in FIGS. 4A and 4B described below.

Figure 4A:
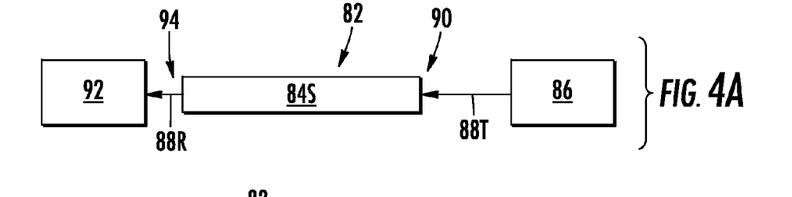
FIG. 4A is a schematic diagram illustrating an exemplary double-ended optical loss measurement apparatus performing a double-ended optical loss measurement of an optical fiber sample.
Figure 4B:
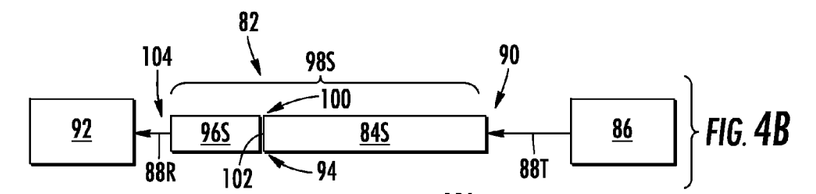
FIG. 4B is a schematic diagram illustrating the double-ended optical loss measurement apparatus in FIG. 4A performing a double-ended optical loss measurement of a joined optical fiber sample comprising a stub fiber sample joined with the optical fiber sample in FIG. 4A, wherein the optical fiber sample may have a dissimilar backscatter light collection efficiency from the stub fiber.

As illustrated in FIG. 4A and FIG. 4B, a double-ended direct optical loss measurement apparatus 82 is provided to determine a baseline optical loss measurement on a provided first optical fiber sample 84S and a joined optical fiber sample 98S that includes the first optical fiber sample 84S joined to a second optical fiber sample 96S. The baseline optical loss measurement performed on the first optical fiber sample 84S is illustrated in FIG. 4A. The baseline optical loss measurement performed on the joined optical fiber sample 98S is illustrated in FIG. 4B. With reference to FIG. 4A, an optical transmitter 86 is provided that launches an optical signal 88T into a first end 90, or input end 90, of the first optical fiber sample 84S. The optical transmitter 86 may be a laser light source or other light source that can provide the optical signal 88T of stable light intensity. As a non-limiting example, the optical transmitter 86 may be a single mode light source, such as a laser, configured to emit a wavelength of 1550 nanometers (nm) with a wavelength tolerance error of +/−20 nm, or 1310 nm with a wavelength tolerance error of +/−20 nm, with an optical power of 1.0 dBm. As another non-limiting example, the optical transmitter 86 may be a multi-mode light source, such as a light emitting diode (LED), configured to emit a wavelength of 850 nm with a wavelength tolerance error of +/−25 nm, with an optical power of −21.0 dBm. An optical power detector 92 is disposed on a second end 94, or output end 94, of the first optical fiber sample 84S to receive the light 88R transmitted in the first optical fiber sample 84S. The difference in intensity of the optical light 88R from the intensity of the optical signal 88T is the baseline optical power in the first optical fiber sample 84S. An example of the baseline direct optical power in the first optical fiber sample 84S may be 0.9 dBm with a measurement tolerance error of +/−0.02 dBm. The error tolerance may be known based on the known accuracy for the optical power detector 92.

With reference back to FIG. 3, after the baseline optical power measurement of the first optical fiber sample 84S is determined, a second optical fiber sample 96S is joined with the first optical fiber sample 84S to form a joined optical fiber sample 98S (block 72). As an example, the second optical fiber sample 96S may be a fiber stub sample spliced on its first end 100, via splice 102, to an optical fiber provided in a fiber optic cable as the first optical fiber sample 84S. This is illustrated by example in FIG. 4B. The second optical fiber sample 96S is chosen to have the same or substantially similar optical properties as a second optical fiber that will be joined to a first optical fiber to provide a joined optical fiber to be tested with an OTDR optical loss measurement. In this manner, the direct optical loss measurement of the joined optical fiber sample 98S will the same as the expected direct optical loss of a joined optical fiber that has the same or substantially similar backscatter light collection efficiencies as the joined optical fiber sample 98S. The first optical fiber sample 84S and the second optical fiber sample 96S may be single mode or multi-mode optical fibers.

In this regard, a direct optical loss measurement of the joined optical fiber sample 98S can be performed by the double-end, direct optical loss measurement apparatus 82 in FIG. 4B (block 74 in FIG. 3). As illustrated therein, the optical power detector 92 is disposed on a second end 104, or output end 104, of the second optical fiber sample 96S to receive the light 88R transmitted in the joined optical fiber sample 98S. The difference in intensity of the optical light 88R from the intensity of the optical signal 88T is the direct optical loss in the joined optical fiber sample 98S. An example of the direct optical power in the joined optical fiber sample 98S may be 0.7 dBm. Thus, the direct optical loss in the joined optical fiber sample 98S would be 0.2 dB in the present example (i.e., 0.9 dBm baseline optical power minus 0.7 dBm optical power of the joined optical fiber sample 98S) with a tolerance of +/−0.07 dBm.

Just as provided for the first optical fiber sample 84S in FIG. 4A, the double-ended, direct optical loss measurement in FIG. 4B is performed on the joined optical fiber sample 98S as opposed to the actual joined optical fiber of interest. This is because it may not be feasible, or it may be difficult, to perform a double-ended optical fiber loss measurement on the joined optical fiber of interest. This is why OTDR optical loss measurement is employed to determine the optical loss of the joined optical fiber of interest, as discussed below.

Next, a single-ended, OTDR optical loss measurement of the joined optical fiber sample 98S is performed (block 76 in FIG. 3). The OTDR calibration factor for the joined optical fiber sample 98S is the difference between the OTDR optical loss measurement of the joined optical fiber sample 98S and the direct optical loss of the joined optical fiber sample 98S determined in block 74 in FIG. 3. In other words, by knowing the actual, double-ended, direct optical loss measurement of the joined optical fiber sample 98S, any difference between the direct optical loss measurement of the joined optical fiber sample 98S and the OTDR optical loss measurement of the joined optical fiber sample 98S is known to be the error in the OTDR optical loss measurement on the joined optical fiber sample 98S. Thus, by knowing this error, an OTDR calibration factor can be determined that is designed to offset this error when performing OTDR optical loss measurement on a joined optical fiber having the same or substantially similar backscatter light collection efficiency to the joined optical fiber sample 98S. As previously discussed, the OTDR optical loss measurement error may be present as a result of the first optical fiber sample 84S and the second optical fiber sample 96S forming the joined optical fiber sample 98S having dissimilar backscatter light collection efficiencies, which may be caused by a variety of different optical properties, as discussed above. Examples of these optical properties include but are not limited to differences in core size, material composition, manufacturer, and manufacturing process.

Figure 4C:
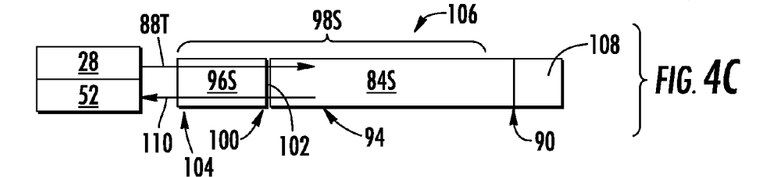
FIG. 4C is a schematic diagram illustrating an exemplary single-ended OTDR loss measurement apparatus performing a single-ended OTDR optical loss measurement of a joined optical fiber sample in FIG. 4B.

In this regard, FIG. 4C provides an example of a single-ended, OTDR optical loss measurement apparatus 106 that can provide an OTDR optical loss measurement apparatus 106 of the joined optical fiber sample 98S (block 76 in FIG. 3). The optical transmitter 28 discussed above in the OTDR 26 in FIG. 2 may be used to launch the optical signal 88T into the second end 104 of the second optical fiber sample 96S. The launched optical signal 88T ideally should be of the same wavelength as launched during double-ended, direct optical loss measurements in FIGS. 4A and 4B, into the joined optical fiber sample 98S. The optical transmitter 28 may be a laser light source or other light source that can provide the optical signal 88T of stable light intensity. As a non-limiting example, the optical transmitter 28 may be a single mode light source, such as a laser, configured to emit a wavelength of 1550 nm with a wavelength tolerance error of +/−20 nm, or 1310 nm with a wavelength tolerance error of +/−20 nm, with an optical power of 1.0 dBm As another non-limiting example, the optical transmitter 28 may be a multi-mode light source, such as a Vertical Cavity Surface Emitting Laser (VCSEL) configured to emit a wavelength of 850 nm with a wavelength tolerance error of +/−25 nm, with an optical power of 1.0 dBm.

With continuing reference to FIG. 4C, a high return loss (RL) termination 108 is disposed on the first end 90 of the first optical fiber sample 84S in the single-ended, OTDR optical loss measurement apparatus 106. The return loss (RL) termination 108 is provided to minimize reflections of the optical signal 88T launched into the joined optical fiber sample 98S being returned, thus saturating the returned backscatter light from the joined optical fiber sample 98S. For example, the high RL termination 108 may provide 75 dBm of loss provided by coiling the first optical fiber sample 84S at a small diameter (e.g., five (5) turns at 5 mm radius). The OTDR detector 52 in the OTDR 26 in FIG. 2 can be disposed on the second end 104 of the second optical fiber sample 96S to receive and detect returned backscatter light 110 from the joined optical fiber sample 98S. The OTDR detector 52 receives the returned backscatter light 110 returned from the joined optical fiber sample 98S as a result of backscattering of the optical signal 88T due to the "Rayleigh" effect, as previously described in FIG. 2 above.

An example of an OTDR optical loss measurement of the joined optical fiber sample 98S in FIG. 4C may be 0.1 dB. Thus, the error in this OTDR optical loss measurement of the joined optical fiber sample 98S is the difference between the OTDR optical loss measurement of the joined optical fiber sample 98S and the direct optical loss measurement of joined optical fiber sample 98S (see block 74 in FIG. 3 and FIG. 4B above). Thus, in this example, the OTDR calibration factor is determined as the error difference (block 78 in FIG. 3). This OTDR calibration factor can used to adjust an OTDR optical loss measurement for a joined optical fiber having the same or substantially similar backscatter light collection efficiency as the joined optical fiber sample 98S. If the second optical fiber sample 96S has the same or substantially similar backscatter light collection efficiency as the first optical fiber sample 84S, the OTDR calibration factor may be zero (0) or close to zero (0).

Figure 4D:
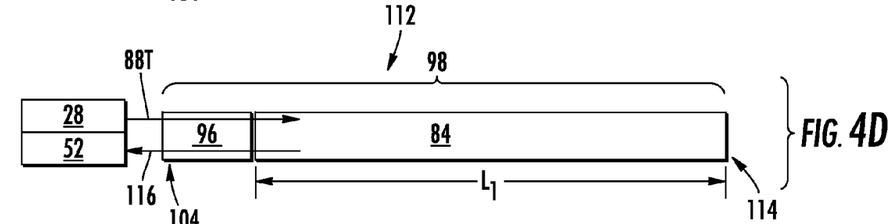
FIG. 4D is a schematic diagram illustrating an exemplary single-ended OTDR loss measurement apparatus performing a single-ended OTDR optical loss measurement of a joined optical fiber having the backscatter light collection efficiencies of the joined optical fiber sample in FIG. 4B.

In this regard, FIG. 4D illustrates a single-end, OTDR optical loss measurement apparatus 112. The OTDR optical loss measurement apparatus 112 is employed to perform an OTDR optical loss measurement of a joined optical fiber 98 that has the same or substantially similar backscatter light collection efficiency as the joined optical fiber sample 98S in FIGS. 4B and 4C (block 80 in FIG. 3). The OTDR optical loss measurement apparatus 112 in FIG. 4D contains the same optical transmitter 28 and OTDR detector 52 as provided in the OTDR optical loss measurement apparatus 106 in FIG. 4C. Thus, these components will not be re-described here. As illustrated in FIG. 4D, the joined optical fiber 98 includes a first optical fiber 84 having the same or substantially similar backscatter light collection efficiency as the first optical fiber sample 84S in FIGS. 4A-4C. A second optical fiber 96 having the same or substantially similar backscatter light collection efficiency as the second optical fiber sample 96S illustrated in FIGS. 4B and 4C is joined to the first optical fiber 84 to provide the joined optical fiber 98. Thus, the joined optical fiber 98 will have the same or substantially similar backscatter light collection efficiency as the joined optical fiber sample 98S. The first optical fiber 84 and the second optical fiber 96 may be single mode or multi-mode optical fibers.

With continuing reference to FIG. 4D, the high RL termination 108 in FIG. 4C is not used to terminate the first optical fiber 84 in FIG. 4D, because the first end 114 of the first optical fiber 84 may not be accessible. The first optical fiber 84 can be required to be a length $L_1$ such that reflections of the optical signal 88T do not saturate backscatter light 116 returned from the joined optical fiber 98. As a non-limiting example, OTDR optical loss measurement may require the length $L_1$ of the first optical fiber 84 to be least five (5) meters. High resolution OTDR optical loss measurement may also be provided that may not require the length $L_1$ of the first optical fiber 84 to be at least five (5) meters (e.g., could be 0.5 meters). In addition, as is typically done in OTDR equipment, optical fiber of lengths specified above will need to be included between second optical fiber sample 96S and optical transmitter 28 and the OTDR detector 52. Alternatively, a swept-wavelength interferometry method can be used with resolution as fine as 20 µm thus removing any practical requirement on the length $L_1$ of the first optical fiber 84, may be as short as one (1) centimeter (cm) for example, thus not requiring the high RL termination 108 in FIG. 4C.

With continuing reference to FIG. 4D, the OTDR optical loss measurement of the joined optical fiber 98 provided by OTDR optical loss measurement apparatus 112 can be adjusted with the OTDR calibration factor to provide a resulting OTDR optical loss measurement of the joined optical fiber 98 (block 81 in FIG. 3). In this manner, a double-ended, direct optical loss measurement does not need to be performed on the joined optical fiber 98 to determine a more accurate OTDR optical loss measurement of the joined optical fiber 98. As discussed above, determining accurate optical loss measurement of the joined optical fiber 98 allows determination of optical loss that may have resulted from joinder of the second optical fiber 96 to the first optical fiber 84. For example, in the present example, if the OTDR optical loss measurement of the joined optical fiber 98 provided by the OTDR optical loss measurement apparatus 112 is 0.5 dB, the OTDR calibration factor of −0.3 dB can be used to adjust the OTDR optical loss measurement of the joined optical fiber 98 to 0.2 dB.

Figure 5:
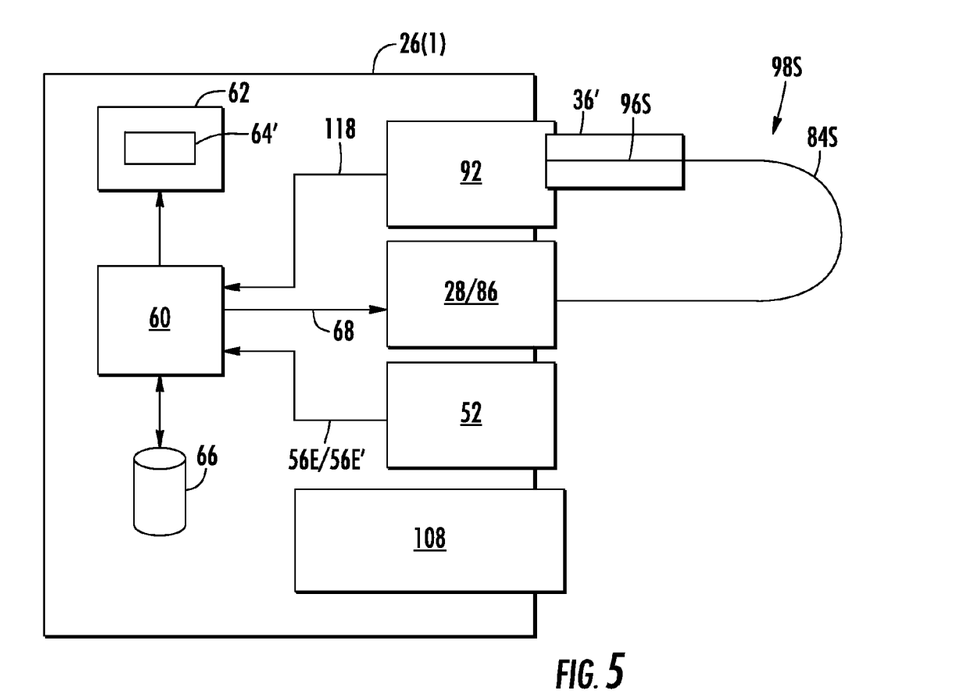
FIG. 5 is a schematic diagram of an exemplary OTDR comprising a power meter and light source for use performing a double-ended optical loss measurement of an optical fiber, and a separate optical receiver and high return loss (RL) termination for use in performing a single-ended, OTDR optical loss measurement of an optical fiber.

Different arrangements of OTDRs configured to determine OTDR calibration factors for joined optical fibers using joined optical fiber samples and perform OTDR optical loss measurements on joined optical fibers may be provided. For example, FIG. 5 is a schematic diagram of an exemplary OTDR 26(1). The OTDR 26(1) provides for both the ability to determine OTDR calibration factors for joined optical fibers using joined optical fiber samples and to perform OTDR optical loss measurements on joined optical fibers in a single OTDR device.

In this regard, with reference to FIG. 5, the OTDR 26(1) includes optical transmitter 28 and optical transmitter 86 provided as a common transmitter for use in determining an OTDR calibration factor on optical fiber samples and for performing OTDR optical loss measurements on joined optical fibers. The optical power detector 92 used for performing double-ended, direct optical loss measurements on optical fiber samples for determining an OTDR calibration factor is also provided in the OTDR 26(1), as illustrated in FIG. 5. The direct optical loss measurements detected by the optical power detector 92 can be provided to the controller 60 over a direct optical loss line coupled to the controller 60. The high RL termination 108 used for performing single-ended, OTDR optical loss measurements on joined optical fiber samples for determining an OTDR calibration factor is also provided in the OTDR 26(1). The OTDR detector 52 for performing single-ended, OTDR optical loss measurements for determining an OTDR calibration factor and for performing OTDR optical loss measurements on joined optical fibers is also provided in the OTDR 26(1). The controller 60 may be configured to control initiation of an OTDR 26(1) via the control line 68 to perform optical loss measurement functions for determining an OTDR calibration factor and for performing OTDR optical loss measurements on joined optical fibers.

Figure 6:
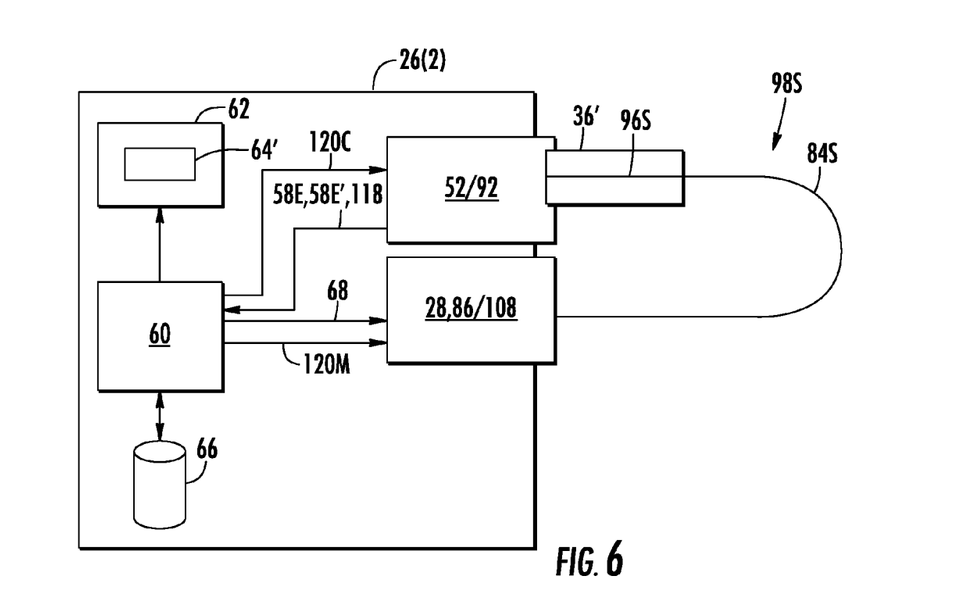
FIG. 6 is a schematic diagram of an exemplary OTDR comprising a combined power meter and optical receiver, and a combined light source and high RL termination for use performing a double-ended optical loss measurement of an optical fiber or a single-ended, OTDR optical loss measurement of an optical fiber, respectively.

It may be desired to provide components in the OTDR 26(1) in FIG. 5 in common components or packaging since components involved in determining an OTDR calibration factor may not be needed to be employed at the same time as components involved in performing OTDR optical loss measurements on joined optical fibers are employed. In this regard, FIG. 6 illustrates an alternative OTDR 26(2) to the OTDR 26(1) in FIG. 5. The optical power detector 92 and OTDR detector 52 may be provided by a common detector, as illustrated in FIG. 6. The optical transmitter 28 and optical transmitter 86 may be provided as a common transmitter, as also illustrated in FIG. 6. The high RL termination 108 may also be provided in common packaging with the optical transmitter 28 and optical transmitter 86. The controller 60 may be configured to generate an OTDR calibration signal 120C to these OTDR 26(2) components so that these components operate to perform operations to determine an OTDR calibration factor, such as previously discussed in FIG. 3. The controller 60 may also be configured to generate a OTDR optical loss measurement signal 120M to these OTDR 26(2) components so that these components then operate to perform operations to determine an OTDR optical loss measurement of a joined optical fiber using the determined OTDR calibration factor, such as previously discussed in FIG. 3. The joined optical fiber sample 98S is shown connected between the OTDR 26(2) components. As previously discussed, the determined OTDR calibration factor may be stored by the controller 60 in memory 66 to be later used in adjusting an OTDR optical loss measurement of a joined optical fiber.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments of the controllers in the OTDRs disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the present disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

I claim:

1. A method of calibrating an optical time domain reflectometer (OTDR) used to measure optical loss of an optical fiber, comprising:
    providing a joined optical fiber sample having a backscatter light collection efficiency, the joined optical fiber sample comprising a first optical fiber sample having a first backscatter light collection efficiency joined to a second optical fiber sample having a second backscatter light collection efficiency;
    measuring a direct optical loss of the joined optical fiber sample using a double-ended optical loss measurement of the joined optical fiber sample;
    measuring an OTDR optical loss of the joined optical fiber sample using a single-ended OTDR optical loss measurement of the joined optical fiber sample;
    determining an OTDR calibration factor for the joined optical fiber sample based on the direct optical loss measurement of the joined optical fiber sample and the OTDR optical loss measurement of the joined optical fiber sample;
    measuring an OTDR optical loss of a joined optical fiber using a single-ended OTDR optical loss measurement the joined optical fiber, the joined optical fiber comprising a first optical fiber having the first backscatter light collection efficiency of the first optical fiber sample and a second optical fiber having the second backscatter light collection efficiency of the second optical fiber sample;
    adjusting the OTDR optical loss measurement of the joined optical fiber based on the OTDR calibration factor; and
    providing the adjusted OTDR optical loss measurement as the optical loss of the joined optical fiber.

2. The method of claim 1, wherein the second backscatter light collection efficiency of the second optical fiber sample is different from the first backscatter light collection efficiency of the first optical fiber sample.

3. The method of claim 1, wherein determining the OTDR calibration factor comprises subtracting the OTDR optical loss of the joined optical fiber sample from the direct optical loss of the joined optical fiber sample.

4. The method of claim 1, further comprising measuring a direct optical loss of the first optical fiber sample to provide a baseline optical loss of the joined optical fiber sample;
    wherein adjusting the OTDR optical loss measurement of the joined optical fiber further comprises adjusting the OTDR optical loss measurement of the joined optical fiber based on the baseline optical loss of the joined optical fiber sample.

5. The method of claim 1, further comprising terminating the joined optical fiber sample with a return loss (RL) termination after the measuring of the direct optical loss of the sample of the optical fiber and before the measuring of the OTDR optical loss of the sample of the optical fiber.

6. The method of claim 1, further comprising not terminating an end of the joined optical fiber during the measuring of the OTDR optical loss of the joined optical fiber.

7. The method of claim 1, wherein providing the joined optical fiber sample further comprises splicing the second optical fiber sample to the first optical fiber sample.

8. The method of claim 1, wherein the first optical fiber is comprised of an optical fiber from a fiber optic cable, and the second optical fiber is comprised of a stub fiber from a fiber optic connector joined to the optical fiber from the fiber optic cable.

9. The method of claim 1, wherein the second optical fiber sample has at least one dissimilar property from the first optical fiber sample comprised from the group consisting of: core size, material composition, manufacturer, and manufacturing process.

10. The method of claim 1, wherein the first optical fiber sample and the second optical fiber sample are each comprised of single mode optical fibers.

11. The method of claim 1, wherein the first optical fiber sample and the second optical fiber sample are each comprised of multi-mode optical fibers.

12. An optical time domain reflectometer (OTDR), comprising:
an optical transmitter configured to be coupled to a first end of a joined optical fiber, the optical transmitter configured to launch a light into the first end of the joined optical fiber towards a second end of the joined optical fiber, the joined optical fiber comprising a first optical fiber having a first backscatter light collection efficiency joined to a second optical fiber having a second backscatter light collection efficiency;
an OTDR optical detector configured to be coupled to the first end of the joined optical fiber, the OTDR optical detector configured to:
receive an OTDR optical signal comprising backscattered light from the joined optical fiber, the backscattered light comprising returned scattered light from the light launched into the joined optical fiber; and
convert the received OTDR optical signal into an OTDR electrical signal representing an OTDR optical loss measurement in the joined optical fiber; and
a controller configured to:
receive an OTDR calibration factor based on a direct optical loss measurement of a joined optical fiber sample and the OTDR optical loss measurement of the joined optical fiber sample, the joint optical fiber sample comprising of a first optical fiber sample having the first backscatter light collection efficiency of the first optical fiber and a second optical fiber sample having the second backscatter light collection efficiency of the second optical fiber;
store the OTDR calibration factor in memory;
receive the OTDR electrical signal from the OTDR optical detector representing the OTDR optical loss measurement in the joined optical fiber;
adjust the OTDR optical loss measurement of the joined optical fiber based on the stored OTDR calibration factor; and
provide the adjusted OTDR optical loss measurement of the joined optical fiber as an OTDR optical loss of the joined optical fiber.

13. The OTDR of claim 12, wherein the controller is further configured to display the adjusted OTDR optical loss measurement of the joined optical fiber on a display.

14. The OTDR of claim 12, wherein the controller is configured to receive the OTDR calibration factor comprising a subtraction of the OTDR optical loss of the joined optical fiber sample from the direct optical loss of the joined optical fiber sample.

15. The OTDR of claim 12, further comprising a return loss (RL) termination configured to be coupled to a second end of the joined optical fiber the optical transmitter launch the light into the first end of the joined optical fiber towards the second end of the joined optical fiber.

16. The OTDR of claim 15, wherein:
the optical transmitter is further configured to be coupled to a first end of a joined optical fiber sample, the optical transmitter configured to launch a light into the first end of a joined optical fiber sample towards a second end of the joined optical fiber sample;
the OTDR optical detector is further configured to be coupled to the first end of the joined optical fiber sample, the OTDR optical detector configured to receive an OTDR optical signal comprising backscattered light from joined optical fiber sample, the backscattered light comprising returned scattered light from the light launched into the joined optical fiber sample; and
the OTDR converter is further to convert the received OTDR optical signal comprising the backscattered light from joined optical fiber sample into an OTDR electrical signal representing the OTDR optical loss measurement in the joined optical fiber sample.

17. The OTDR of claim 15, wherein the optical transmitter and the return loss (RL) termination are each coupled to a second common optical fiber connection port.

18. The OTDR of claim 12, further comprising an optical power meter configured to be coupled to a second end of the joined optical fiber sample, the optical power meter further configured to:
receive a direct optical signal representing the light launched from the optical transmitter into the first end of the joined optical fiber sample; and
a direct loss converter configured to convert the received direct optical signal into a direct loss electrical signal representing the direct optical loss measurement in the joined optical fiber sample.

19. The OTDR of claim 18, wherein the OTDR optical detector comprises the optical power meter.

20. The OTDR of claim 18, wherein the OTDR optical detector and the optical power meter are each coupled to a first common optical fiber connection port.

* * * * *